(12) United States Patent
Yamamoto et al.

(10) Patent No.: US 7,283,211 B2
(45) Date of Patent: Oct. 16, 2007

(54) DISTANCE-MEASURING OPTICAL APPARATUS, DISTANCE-MEASURING METHOD, DISTANCE-MEASURING SYSTEM, IN-VEHICLE IMAGER, AND IN-VEHICLE DRIVING SUPPORT APPARATUS

(75) Inventors: Yoshiharu Yamamoto, Toyonaka (JP); Motonobu Yoshikawa, Osaka (JP); Daizaburo Matsuki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 202 days.

(21) Appl. No.: 11/192,406

(22) Filed: Jul. 29, 2005

(65) Prior Publication Data

US 2006/0023200 A1 Feb. 2, 2006

(30) Foreign Application Priority Data

Jul. 30, 2004 (JP) .............................. 2004-224115

(51) Int. Cl.
*G01C 3/08* (2006.01)
(52) U.S. Cl. ..................................... 356/4.03; 382/100
(58) Field of Classification Search ................ 356/4.03
See application file for complete search history.

(56) References Cited

U.S. PATENT DOCUMENTS 4,699,507 A * 10/1987 Etoh ......................... 356/5.08

| | | | |
|---|---|---|---|
| 6,661,500 B1 * | 12/2003 | Kindt et al. ................ 356/5.04 |
| 6,801,639 B2 * | 10/2004 | Nonaka et al. ............. 382/106 |
| 2003/0107667 A1 * | 6/2003 | Abe et al. ................... 348/341 |
| 2003/0189500 A1 * | 10/2003 | Lim ........................... 340/937 |
| 2005/0057746 A1 * | 3/2005 | Takahashi et al. ..... 356/139.07 |

FOREIGN PATENT DOCUMENTS

| | | |
|---|---|---|
| JP | 60-216206 | 10/1985 |
| JP | 08-233571 | 9/1996 |
| JP | 2002-296491 | 9/2002 |

* cited by examiner

*Primary Examiner*—Thomas H. Tarcza
*Assistant Examiner*—Timothy Brainard
(74) *Attorney, Agent, or Firm*—McDermott Will & Emery LLP

(57) ABSTRACT

A distance-measuring optical apparatus for measuring a distance to an object as a target comprises an imaging optical system; an image sensor; a driving section for moving at least the imaging optical system substantially perpendicular to an optical axis; an image sensor control section for outputting a periodical timing signal for designating a timing at which the image sensor takes an object image; and a driving control section for controlling the driving section to reciprocate the imaging optical system. The timing signal is periodically output when the imaging optical system is located near two positions away from each other in a direction substantially perpendicular to the optical axis. The distance-measuring optical apparatus further comprises an image processing operation section for finding, through an operation, a distance from the imaging optical system to the object using the image signal when the imaging optical system is at each of the two positions.

18 Claims, 18 Drawing Sheets

F I G. 2
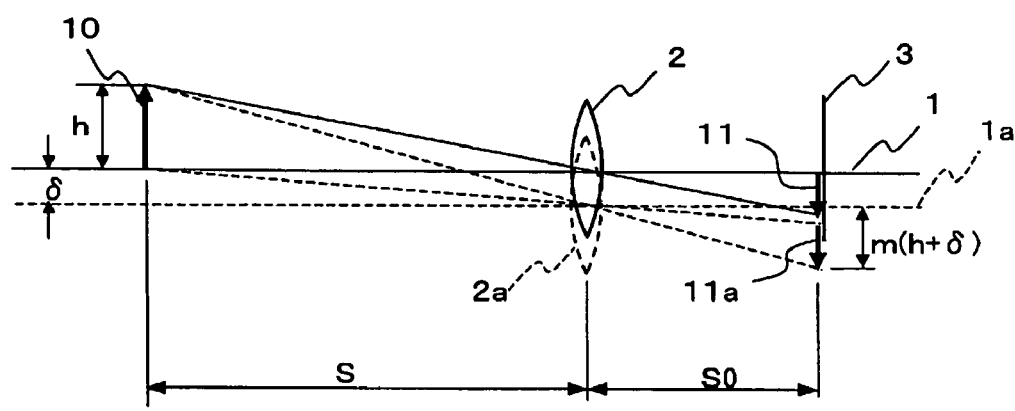

F I G. 9
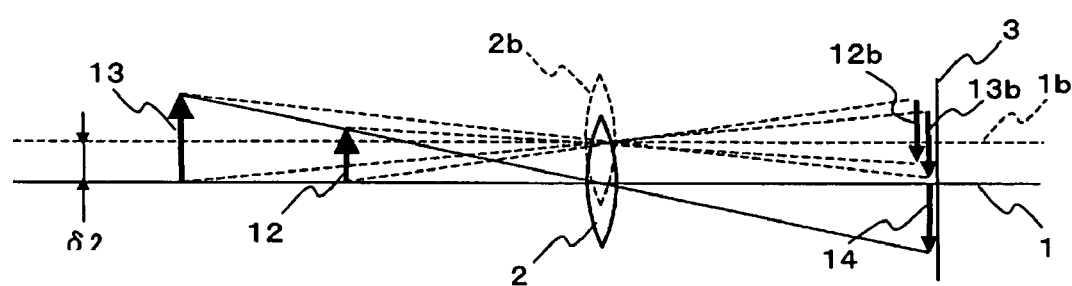

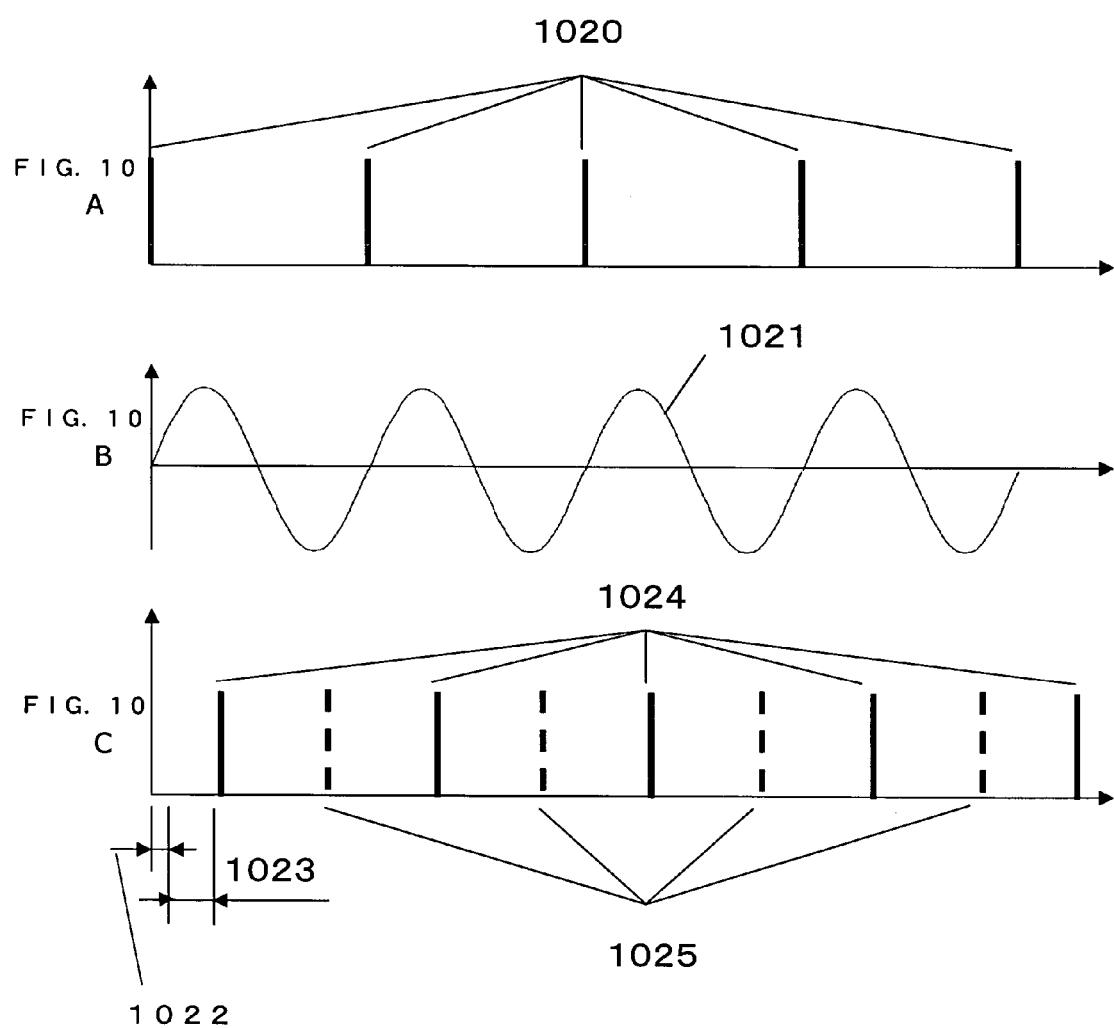

F I G. 1 1
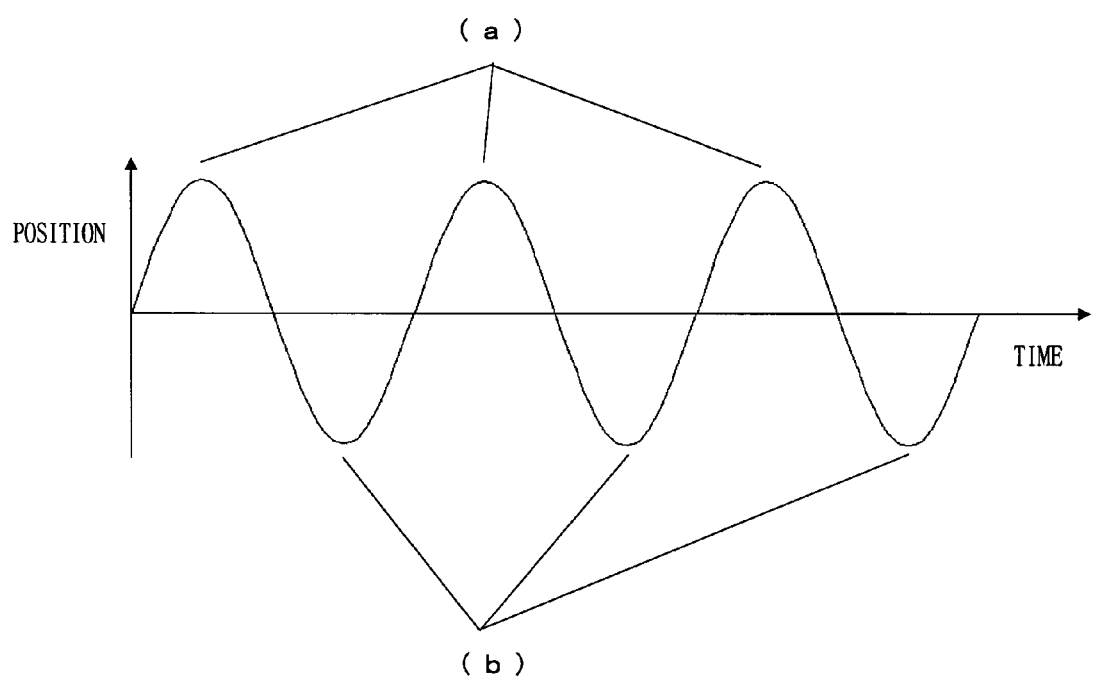

F I G. 1 4
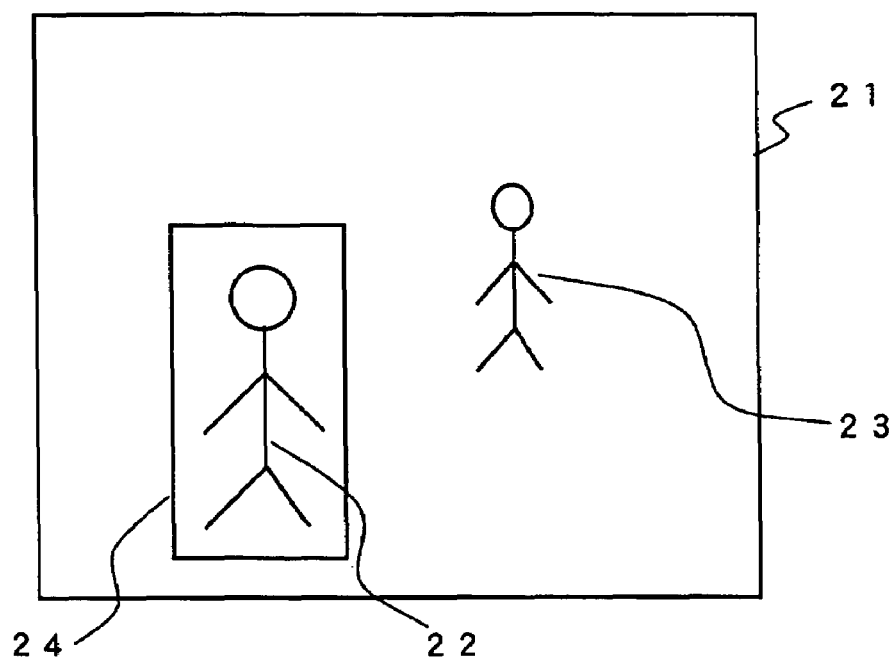

F I G. 1 5
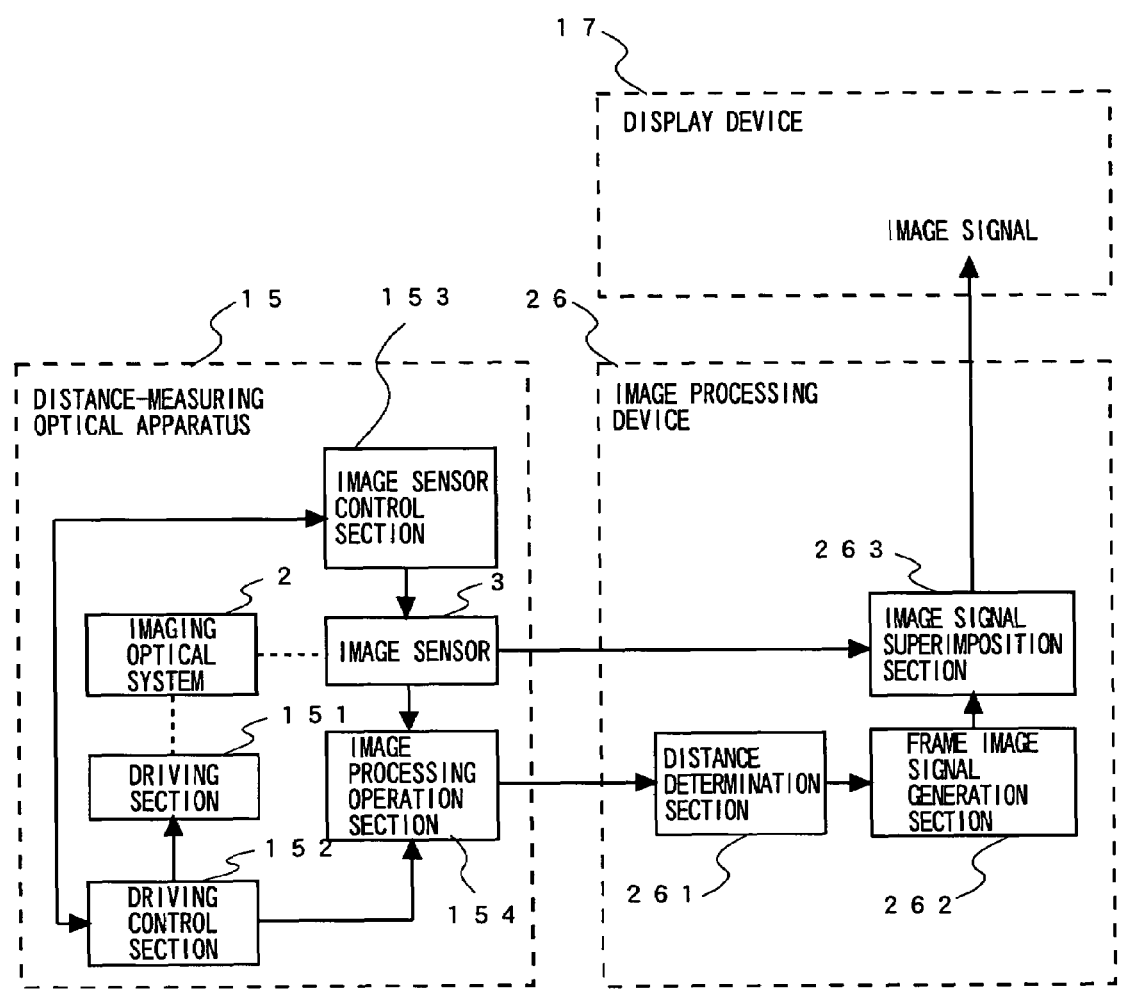

DISTANCE-MEASURING OPTICAL APPARATUS, DISTANCE-MEASURING METHOD, DISTANCE-MEASURING SYSTEM, IN-VEHICLE IMAGER, AND IN-VEHICLE DRIVING SUPPORT APPARATUS

BACKGROUND OF THE INVENTION

1. Field of the Invention

The present invention relates to a distance-measuring optical apparatus for measuring a distance to an object to be imaged using an imaging optical system and an image sensor, a distance-measuring method using such a distance-measuring optical apparatus, and a distance-measuring system for generating information to be recognized by the operator in accordance with the distance measured by the distance-measuring optical apparatus and presenting the information. The present invention also relates to an in-vehicle imager including the above-described distance-measuring optical apparatus, and an in-vehicle driving support apparatus including the above-described distance-measuring system.

2. Description of the Background Art

As distance-measuring optical apparatuses for measuring a distance to an object to be imaged, apparatuses using a so-called triangular distance-measuring system are known. According to a triangular distance-measuring system described in, for example, Japanese Laid-Open Patent Publication No. 8-233571, light from a light emitting diode or the like is spot-projected toward a measurement target, the distance to which is to be measured, via a projection lens; and the light reflected by the measurement target is received by a position detection element via a light receiving lens. Based on the light receiving position detected by the position detection element, the distance to the measurement target can be found out.

Japanese Laid-Open Patent Publication No. 60-216206 proposes a three-dimensional image generation apparatus including an imaging section. The three-dimensional image generation apparatus described in Japanese Laid-Open Patent Publication No. 60-216206 includes an imaging section and a moving mechanism for moving the imaging section substantially perpendicular to an optical axis. Each time a three-dimensional image is to be taken, the imaging section is moved to take a plurality of images, and parallax is found by a operation based on the images, so as to generate a three-dimensional image.

According to the triangular distance-measuring system described in Japanese Laid-Open Patent Publication No. 8-233571, various elements for distance measurement are required including an optical source and an optical system for projecting light, a position detection element for receiving light, and the like.

In order to check the view behind a vehicle, an in-vehicle imager is occasionally mounted. In this case, it is necessary to measure a distance between the vehicle and an object behind the vehicle so as to grasp the distance accurately, in addition to visually observe the object. When using the triangular distance-measuring optical apparatus described in Japanese Laid-Open Patent Publication No. 8-233571 to measure the distance, an optical system for taking images and also an optical system for measuring distances are required. This enlarges the overall size of the apparatus against the general demand for size reduction.

The three-dimensional image generation apparatus described in Japanese Laid-Open Patent Publication No. 60-216206 is intended to generate a three-dimensional image when the imaging section is in a still state. This three-dimensional image generation apparatus is not intended to be used in a distance-measuring optical apparatus mounted on an in-vehicle imager for measuring distances at high speed in a moving body and outputting the distance-measuring results successively.

SUMMARY OF THE INVENTION

Therefore, an object of the present invention made in light of the above-described circumstances is to provide a distance-measuring optical apparatus capable of measuring a distance at high speed in a moving body and outputting the distance-measuring results successively despite a simple structure using an imaging optical system. Another object of the present invention is to provide a distance-measuring method using such a distance-measuring optical apparatus. Still another object of the present invention is to provide a distance-measuring system using such a distance-measuring optical apparatus.

One object of the present invention is achieved by the following distance-measuring optical apparatus. The distance-measuring optical apparatus for measuring a distance to an object as a target comprises an imaging optical system for forming an image of the object; an image sensor for taking the image of the object formed by the imaging optical system, converting the image into an electrical image signal, and outputting the image signal; a driving section for moving at least the imaging optical system substantially perpendicular to an optical axis; an image sensor control section for outputting a periodical timing signal for designating a timing at which the image sensor takes the image of the object; and a driving control section for controlling the driving section such that the imaging optical system reciprocates at a predetermined cycle between two positions which are away from each other in a direction substantially perpendicular to the optical axis. The timing signal is periodically output when the imaging optical system driven by the driving section is located in the vicinity of the two positions which are away from each other in a direction substantially perpendicular to the optical axis; and the distance-measuring optical apparatus further comprises an image processing operation section for receiving an image signal from the image sensor and performing an operation to obtain the distance from the imaging optical system to the object, using the image signal converted when the imaging optical system is at each of the two positions which are away from each other in a direction substantially perpendicular to the optical axis.

Preferably, the driving section moves the imaging optical system in one direction with respect to the optical axis. At this point, preferably, $\delta 1 \geq P/|m-m'|$ where m is the image forming magnification of an object located at a shortest imaging distance of the imaging optical system, m' is the image forming magnification of an object which is away from the object at the shortest imaging distance by a distance-measuring resolvable distance, P is the pixel pitch of the image sensor, and $\delta 1$ is the distance by which the imaging optical system is moved in one direction substantially perpendicular to to the optical axis.

Preferably, the driving section moves the imaging optical system in two directions with respect to the optical axis. At this point, preferably, $\delta 2 \geq P/(|2m-m'|)$ where m is the image forming magnification of an object located at a shortest imaging distance of the imaging optical system, m' is the image forming magnification of an object which is away from the object at the shortest imaging distance by a distance-measuring resolvable distance, P is the pixel pitch of the image sensor, and δ2 is the distance by which the imaging optical system is moved in each of the two directions substantially perpendicular to the optical axis.

The driving section may move the imaging optical system and the image sensor substantially perpendicular to the optical axis. The driving section may move only the imaging optical system substantially perpendicular to the optical axis.

One object of the present invention is achieved by the following distance-measuring method. The distance-measuring method measures a distance to an object as a target, using an imaging optical system for forming an image of the object; an image sensor for taking the image of the object formed by the imaging optical system, converting the image into an electrical image signal, and outputting the image signal; and a driving section for moving at least the imaging optical system substantially perpendicular to an optical axis. The distance-measuring method comprises the steps of reciprocating the imaging optical system at a predetermined cycle between two positions which are away from each other in a direction substantially perpendicular to the optical axis; and performing an operation to obtain a distance from the imaging optical system to the object, using the image signal converted by the image sensor when the imaging optical system is at each of the two positions which are away from each other in a direction substantially perpendicular to the optical axis.

One object of the present invention is achieved by the following distance-measuring system. The distance-measuring system for measuring a distance to an object as a target, generating information which is to be recognized by the operator in accordance with the measured distance and presenting the information to the operator comprises a distance-measuring optical apparatus for measuring the distance to the object; and a presentation section for generating information which is to be recognized by the operator in accordance with the distance measured by the distance-measuring optical apparatus and presenting the information to the operator. The distance-measuring optical apparatus includes an imaging optical system for forming an image of the object; an image sensor for taking the image of the object formed by the imaging optical system, converting the image into an electrical image signal, and outputting the image signal; a driving section for moving at least the imaging optical system substantially perpendicular to an optical axis; an image sensor control section for outputting a periodical timing signal for designating a timing at which the image sensor takes the image of the object; and a driving control section for controlling the driving section such that the imaging optical system reciprocates at a predetermined cycle between two positions which are away from each other in a direction substantially perpendicular to the optical axis. The timing signal is periodically output when the imaging optical system driven by the driving section is located in the vicinity of the two positions which are away from each other in a direction substantially perpendicular to the optical axis; and the distance-measuring optical apparatus further comprises an image processing operation section for receiving an image signal from the image sensor and performing an operation to obtain the distance from the imaging optical system to the object, using the image signal converted when the imaging optical system is at each of the two positions which are away from each other in a direction substantially perpendicular to the optical axis.

Preferably, the information to be recognized by the operator is information on a result of comparison of the distance measured by the distance-measuring optical apparatus and a predetermined distance value.

Preferably, the presentation section includes one of a display device for displaying the information as an image signal; a light emitting device for transmitting the information as an optical signal, an illumination device for transmitting the information as an optical signal; a sound generator for transmitting the information as an audio signal; and a vibration generation device for transmitting the information as sense-of-touch information by vibrating a component operated by the operator.

Preferably, the presentation section includes a display device for displaying the information as an image signal, and the display device is capable of displaying the image signal obtained by the image sensor as a visible image.

Preferably, the presentation section may includes a display device for displaying the information as an image signal; and an image processing device for replacing an image signal converted by the image sensor in a period in which the imaging optical system is moving substantially perpendicular to the optical axis with an image signal obtained by the image sensor before the imaging optical system is moved.

Preferably, the presentation section may includes a display device for displaying the information as an image signal; and an image processing device for replacing an image signal converted by the image sensor in a period in which the imaging optical system is moving substantially perpendicular to the optical axis with an image signal generated by motion prediction based on an image signal obtained by the image sensor before the imaging optical system is moved.

In an example, the image processing device may display an image of an object with a short imaging distance in the state of being surrounded by a frame of a highly recognizable color. In another example, the image processing device may display an image of an object with a short imaging distance in the state where the color thereof is converted into a highly recognizable color.

According to the present invention, a distance-measuring optical apparatus capable of measuring a distance at high speed in a moving body and outputting the distance-measuring results successively despite a simple structure using an imaging optical system can be provided. According to the present invention, a distance-measuring method using such a distance-measuring optical apparatus and a distance-measuring system using such a distance-measuring optical apparatus can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows the principle of distance measurement performed by the distance-measuring optical apparatus;

FIG. 9 shows the conditions for the distance measurement;

FIG. 10A is a timing diagram illustrating the relationship between the timing signal for imaging and the driving current in the distance-measuring optical apparatus according to the second embodiment;

FIG. 10B is a timing diagram illustrating the relationship between the timing signal for imaging and the driving current in the distance-measuring optical apparatus according to the second embodiment;

FIG. 10C is a timing diagram illustrating the relationship between the timing signal for imaging and the driving current in the distance-measuring optical apparatus according to the second embodiment;

FIG. 11 is a timing diagram illustrating the movement of the imaging optical system driven by the driving current in the distance-measuring optical apparatus according to the second embodiment;

FIG. 14 shows a display state of a distance-measuring system according to a fifth embodiment of the present invention;

FIG. 15 is block diagram showing a structure of the distance-measuring system according to the fifth embodiment;

DESCRIPTION OF THE PREFERRED EMBODIMENTS

Figure 1:
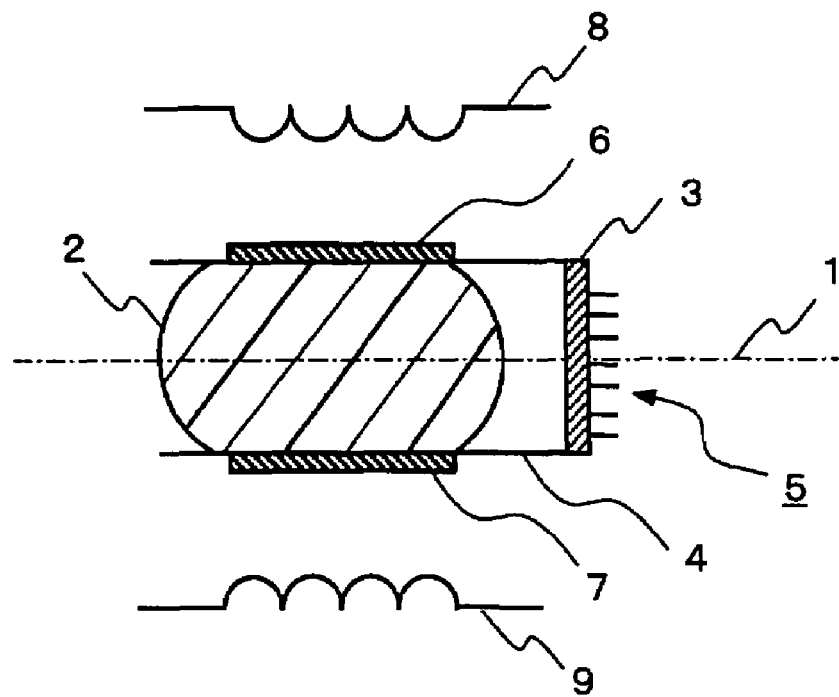
FIG. 1 is a cross-sectional view showing a general structure of a distance-measuring optical apparatus according to a first embodiment of the present invention.

Hereinafter, the present invention will be described by way of embodiments with reference to the drawings. Identical elements bear identical reference numerals.

First Embodiment

FIG. 1 is a cross-sectional view showing a general structure of a distance-measuring optical apparatus according to a first embodiment of the present invention. An imaging optical apparatus 5 includes an imaging optical system 2 and an image sensor 3 which are provided on an optical axis 1 and are integrally formed in a housing 4. On both sides of the housing 4, permanent magnets 6 and 7 are provided. Coils 8 and 9 are provided so as to face the permanent magnets 6 and 7, respectively. When a driving current is flown through the coils 8 and 9 to generate a magnetic field, the imaging optical apparatus 5 moves substantially perpendicular to the optical axis 1 by the interaction of the magnetic field generated by the coils 8 and 9 and a magnetic field generated by the permanent magnets 6 and 7. Image signals obtained by the image sensor 3 before and after the imaging optical apparatus 5 is moved are subjected to an image operation using an appropriate image processing apparatus. Thus, a distance to an object can be measured.

FIG. 2 shows the principle of distance measurement performed by the distance-measuring optical apparatus shown in FIG. 1. As shown in FIG. 1, the imaging optical system 2 and the image sensor 3 included in the imaging optical apparatus 5 are provided on the optical axis 1. An object 10 having a height of h is located at a position away from the imaging optical system 2 by an imaging distance S. The imaging distance S is within a distance-measuring resolvable distance. The image sensor 3 is located at a position away from the imaging optical system 2 by S0, which is the focal length of the imaging optical system 2.

An image 11 of the object 10 formed on the image sensor 3 by the imaging optical system 2 has a height of |mh|, where m is the image forming magnification and is S0/S. The imaging optical apparatus 5 including the imaging optical system 2 and the image sensor 3 is also shown in a post-movement state of having moved substantially perpendicular to the optical axis 1 by a distance δ. Dashed line 1a represents the optical axis and dashed line 2a represents the imaging optical system in this state. The image sensor 3 in such a state is not shown in order to avoid making the figure excessively complicated. The height of the image 11a in the post-movement state (the distance from the optical axis 1a on top of the image 11a) is |m(h+δ)|. The height difference Δh of the image before and after the imaging optical apparatus 5 is moved is:

$$\Delta h = |m(h + \delta)| - |mh|$$
$$= |m|\delta$$
$$= |S0/S|\delta.$$

Accordingly, |S|=|S0|δ/Δh. S0 is a known value which is generally equal to the focal length of the imaging optical system 2. δ is a predetermined known value. Accordingly, once the height difference Δh on the imaging optical apparatus 3 is found, the distance from the imaging optical system 2 to the object 10 can be found. Thus, the distance measurement can be performed. For an image operation to find Δh, the image signals obtained by the image sensor 3 before and after the movement of the imaging optical apparatus 5 may be processed by any known image processing technology.

With the above-described structure, the imaging optical apparatus 5 is moved in only one direction substantially perpendicular to the optical axis 1. Then, a distance to an object is measured based on an image signal obtained by the image sensor 3 when the imaging optical apparatus 5 is located on the optical axis 1 and an image signal obtained by the image sensor 3 when the imaging optical apparatus 5 is located away from optical axis 1. Since the imaging optical apparatus 5 is moved in only one direction, a space required for moving the imaging optical apparatus 5 can be small and thus the distance-measuring optical apparatus can be compact.

Figure 3:
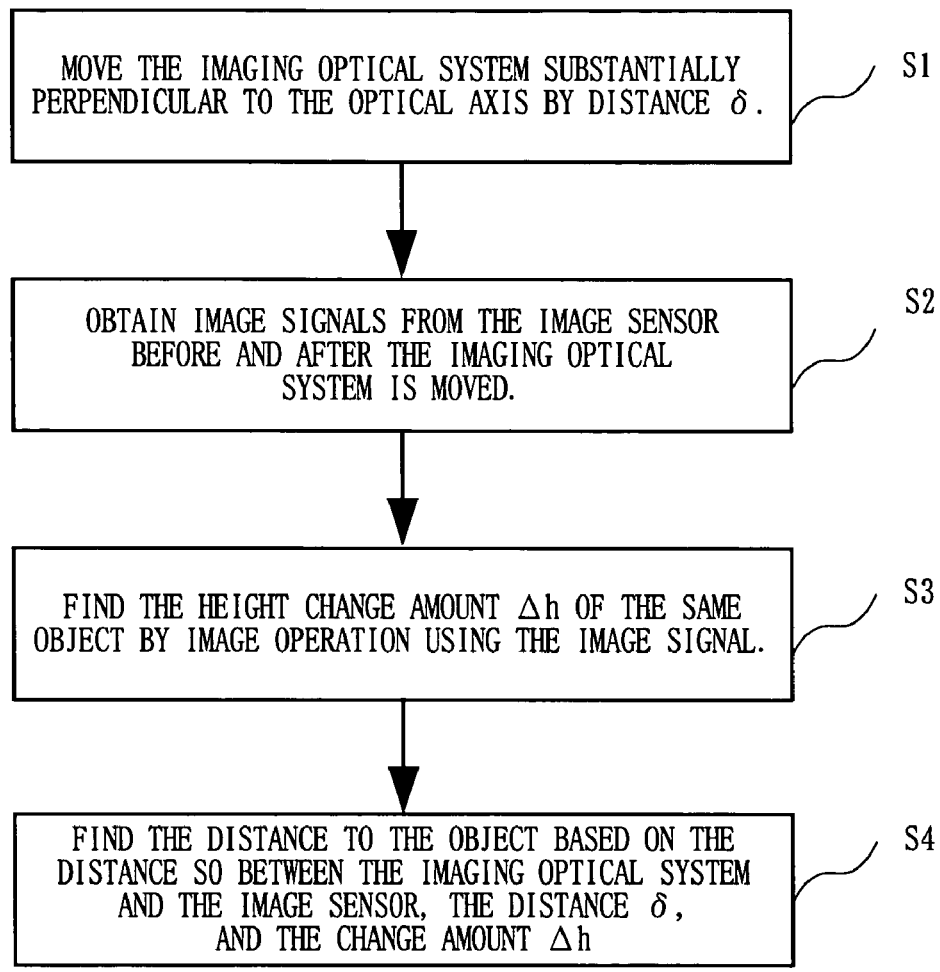
FIG. 3 is a flowchart illustrating a distance-measuring method using the distance-measuring optical apparatus.

FIG. 3 shows a distance-measuring method for measuring a distance to the object 10 using the distance-measuring optical apparatus having the above-described structure. The imaging optical apparatus 5 including the imaging optical system 2 is moved by the distance 6 substantially perpendicular to the optical axis 1 (step S1). Thus, image signals taken before and after the movement of the imaging optical system 2 are obtained by the image sensor 3 (step 2). Next, using the image signals obtained before and after the movement of the imaging optical system 2, the height change amount Δh of the image of the object 10 is found by an image operation (step S3). Finally, the distance from the imaging optical system 2 to the object 10 is obtained based on the distance S0 between the imaging optical system 2 and the image sensor 3, the distance δ, and the height change amount Δh (step S4).

Figure 4:
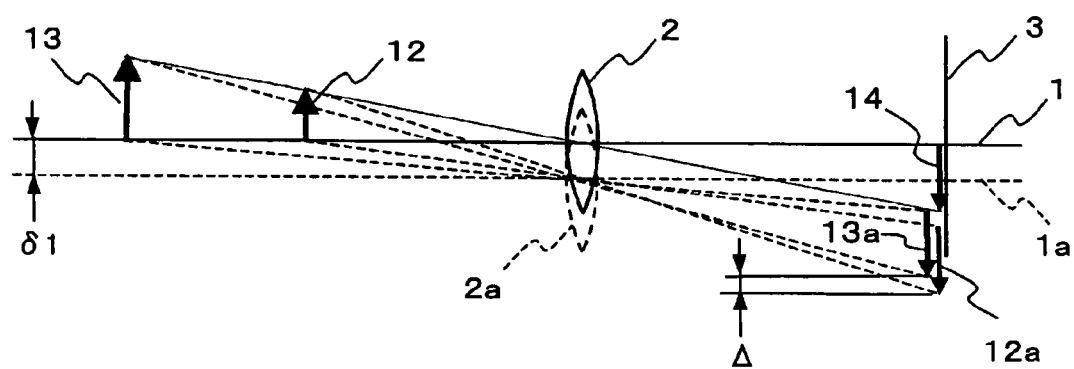
FIG. 4 shows conditions for distance measurement performed by the distance-measuring optical apparatus according to the first embodiment.

FIG. 4 shows conditions for performing distance measurement by the distance-measuring optical apparatus according to this embodiment at practically sufficient precision. As in FIG. 2, the imaging optical system 2 and the image sensor 3 included in the imaging optical apparatus 5 are located on the optical axis 1. A short-distance object 12 is located at a position away from the imaging optical system 2 by a shortest imaging distance (shortest imaging position). A long-distance object 13 is located at a position away from the shortest imaging position by a distance-measuring resolvable distance. The "shortest imaging distance" is defined as a distance between the distance-measuring optical apparatus and a position closest thereto at which an object can be imaged. The shortest imaging distance is determined by conditions set for the elements of the distance-measuring optical apparatus. The "distance-measuring resolvable distance" is defined as a shortest recognizable distance from the shortest imaging position.

The image sensor 3 is provided the focal point of the short-distance object 12. Therefore, the image forming position of the long-distance object 13 is on the side of the objects with respect to the image sensor 3. As a result, an image which is defocused within a tolerable range is formed on the image sensor 3. In this state, the image forming magnification at the shortest imaging distance of the imaging optical apparatus 5 is m, and the image forming magnification, on the image sensor 3, of an object which is away from the shortest imaging position by the distance-measuring resolvable distance is m'. In the state where a main optical beam from the highest position of the short-distance object 12 and a main optical beam from the highest position of the long-distance object 13 are incident in an overlapping state on the entrance pupil of the imaging optical apparatus 2, the height of the short-distance object 12 is "a" and the height of the long-distance object 13 is "b". The height of an image 14 of each of the short-distance object 12 and the long-distance object 13 formed on the image sensor 3 is |ma| and |m'b|, where |ma|=|m'b|.

Next, a state where the imaging optical apparatus 5 has moved in one direction substantially perpendicular to the optical axis 1 by the distance 61 will be discussed. The post-movement optical axis is represented by reference numeral 1a, and the post-movement imaging optical system is represented by reference numeral 2a. The height of an image 12a of the short-distance object 12 and the height of an image 13a of the long-distance object 13, which are formed on the post-movement image sensor 3, are respectively |m(a+δ1)| and |m'(b+δ1)|. As long as the height difference Δh between the images 12a and 13a after the movement is greater than the pixel pitch P of the image sensor 3, the inter-object distance can be recognized. This relationship is represented by expression (1).

$$P \leq |m(a+\delta 1)| - |m'(b+\delta 1)| \tag{1}$$

As a result of expanding and arranging expansion (1), expression (2) is obtained.

$$\delta 1 \geq P/|m-m'| \tag{2}$$

Once the shortest imaging distance to be measured, the distance-measuring resolvable distance, the focal length of the imaging optical system 2, and the pixel pitch P of the image sensor 3 are set, the movement distance δ1 by which the distance-measuring optical apparatus is to be moved substantially perpendicular to the optical axis 1 can be obtained from expression (2).

Figure 5:
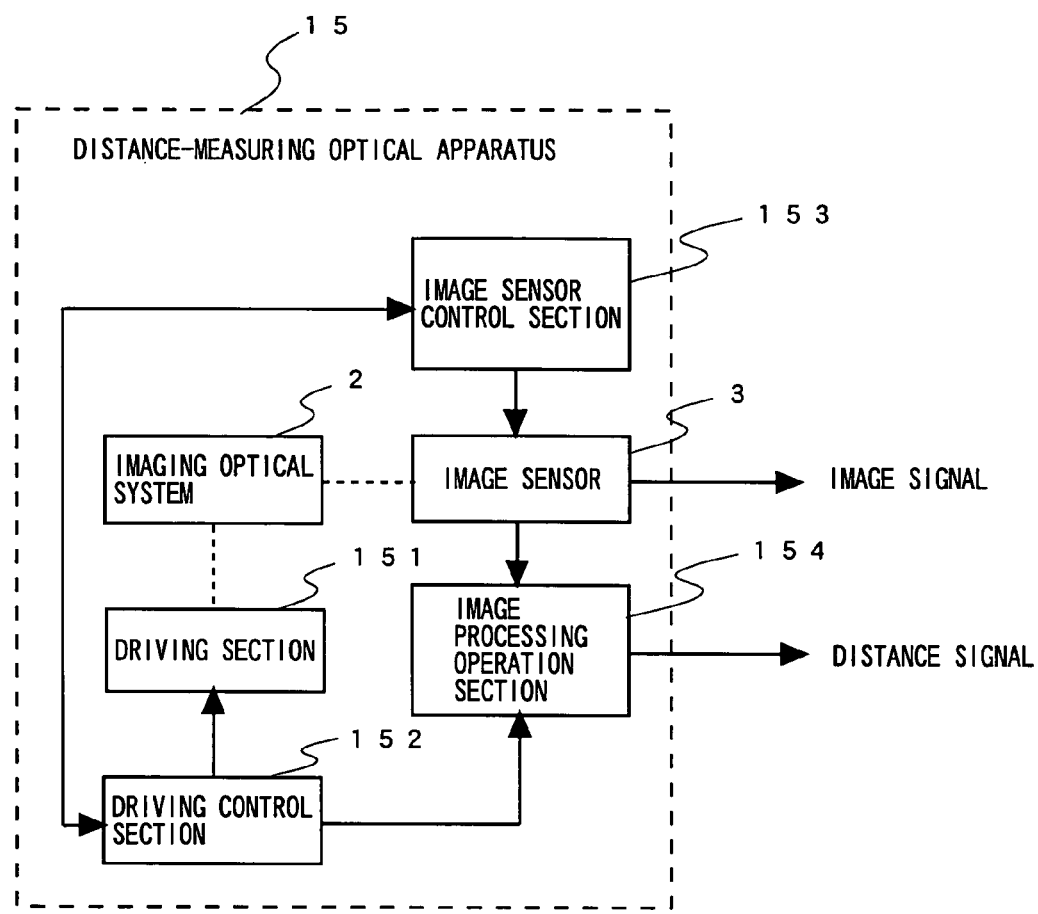
FIG. 5 is a block diagram of the distance-measuring optical apparatus according to the first embodiment.

FIG. 5 is a block diagram of the distance-measuring optical apparatus according to this embodiment. A distance-measuring optical apparatus 15 includes the imaging optical system 2, the image sensor 3, a driving section 151, a driving control section 152, an image sensor control section 153, and an image processing operation section 154.

The driving section 151 corresponds to the coils 8 and 9, and moves the imaging optical system 2 substantially perpendicular to the optical axis 1. The driving control section 152 is a driver for supplying a driving current to the driving section 151. As described later, the driving control section 152 generates a driving current and supplies the driving current to the driving section 151, such that the imaging optical system 2 reciprocates at a predetermined cycle between two positions which are away from each other in a direction substantially perpendicular to the optical axis 1.

The image sensor control section 153 is a timer for controlling the timing at which the image sensor 3 takes images. When a timing signal from the image sensor control section 153 is input to the image sensor 3, the image sensor 3 takes images using a mechanical or electronic shutter as described later. The image sensor control section 153 and the driving control section 152 are connected to each other, and pulses thereof are associated with each other.

The image processing operation section 154 uses image signals output from the image sensor 3 to perform an operation to obtain a distance from the imaging optical system 2 to an object as an imaging target. The image processing operation section 154 is connected to the driving control section 152, and receives a start control signal which is output at the time when the driving control section 152 starts flowing a driving current.

Figure 6:
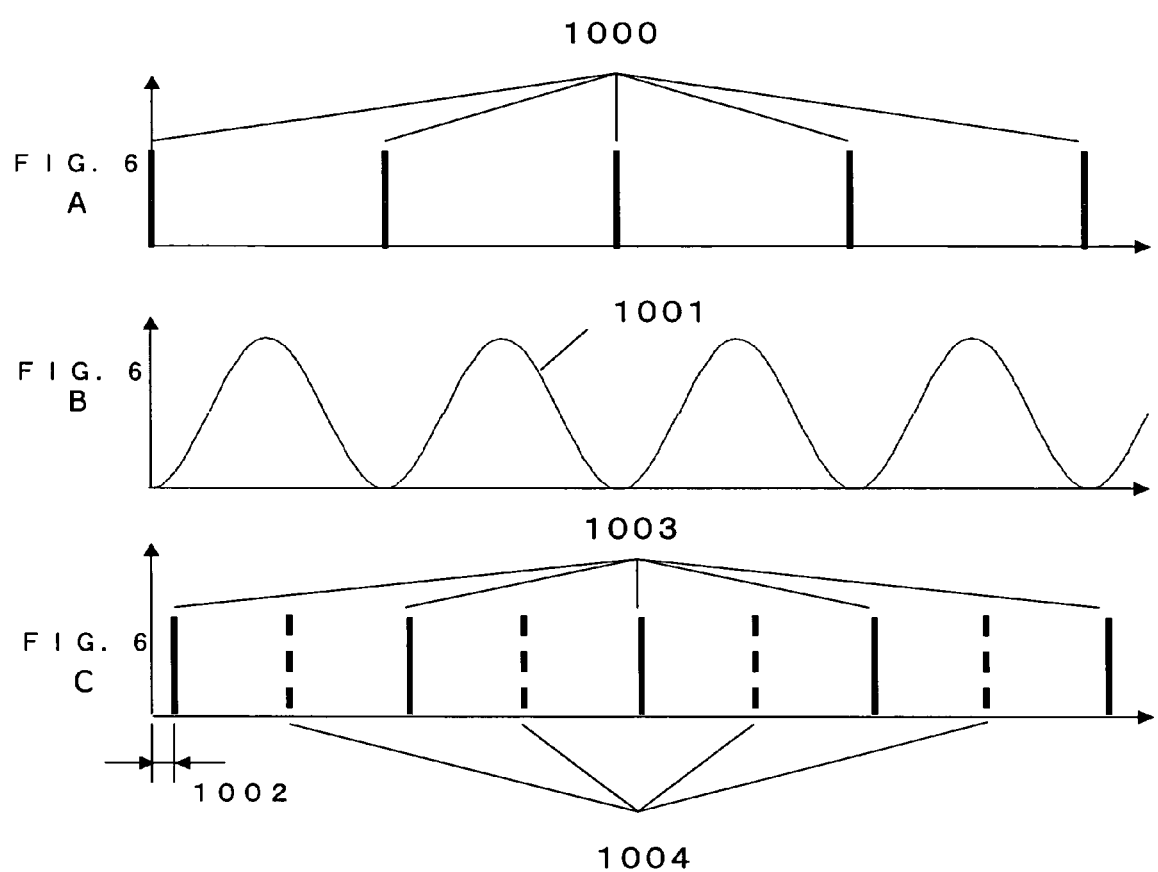
FIG. 6A is a timing diagram illustrating the relationship between the timing signal for imaging and the driving current in the distance-measuring optical apparatus according to the first embodiment.
FIG. 6B is a timing diagram illustrating the relationship between the timing signal for imaging and the driving current in the distance-measuring optical apparatus according to the first embodiment.
FIG. 6C is a timing diagram illustrating the relationship between the timing signal for imaging and the driving current in the distance-measuring optical apparatus according to the first embodiment.
Figure 7:
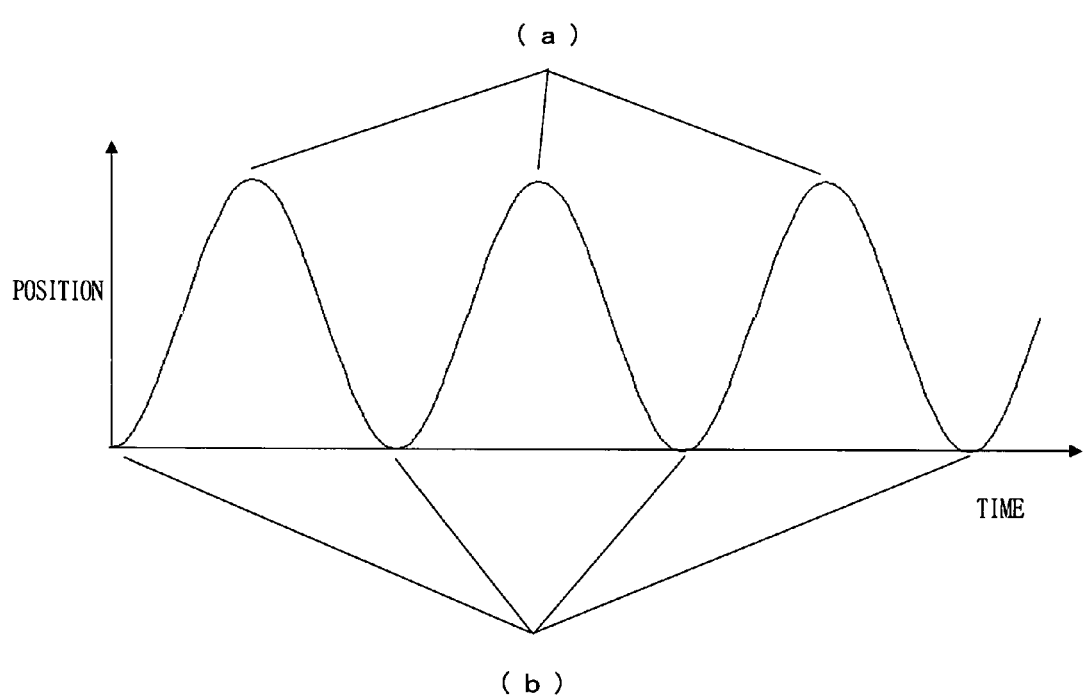
FIG. 7 is a timing diagram illustrating the movement of the imaging optical system driven by the driving current in the distance-measuring optical apparatus according to the first embodiment.

FIG. 6A, FIG. 6B and FIG. 6C are timing diagrams illustrating the relationship between the timing signal for imaging and the driving current in the distance-measuring optical apparatus according to this embodiment. FIG. 6A shows a start control signal 1000 generated by the driving control section 152 and indicating the timing for starting the supply of a driving current to the coils 8 and 9 as the driving section 151. FIG. 6B shows a driving current 1001 supplied from the driving control section 152 to the driving section 151. FIG. 6C shows a timing signal for imaging by the image sensor 3. In all the timing diagrams, the horizontal axis represents the time, and the vertical axis represents the current value or the voltage value. FIG. 7 is a timing diagram showing the movement of the imaging optical system which is driven by the driving current flowing through the coils 8 and 9 of the distance-measuring optical apparatus according to this embodiment. The horizontal axis represents the time, and the vertical axis represents the positional change.

In FIG. 7, letters (a) and (b) both represent the positions at which the speed of the imaging optical system 2 becomes zero and the blur caused by the movement is minimum. According to this embodiment, the image sensor 3 is controlled by a timing signal, so that an image taken at the position represented by (a) (an image signal obtained after the imaging optical system 2 is moved) and an image taken at the position represented by (b) (an image signal obtained before the imaging optical system 2 is moved) are obtained using a mechanical or electronic shutter. By obtaining the image signals both at the position represented by (a) and the position represented by (b), images can be taken for a period with no blur.

It should be noted that the imaging optical system 2 which is driven moves with a delay of a certain time duration with respect to a change in the driving current because of inertia. As a result, the phase of the change in the driving current is advanced with respect to the positional change of the imaging optical system 2. Therefore, a timing signal indicating the time to obtain an image signal before the movement of the imaging optical system 2 needs to be delayed by a phase 1002 corresponding to the delay of the positional change, from the start control signal 1000 for generating the driving current. Reference numeral 1003 represents a control signal acting as such a timing signal. Another timing signal indicating the time to obtain an image signal after the movement of the imaging optical system 2 is set to be delayed by half a period with respect to the control signal 1003. Reference numeral 1004 represents a control signal acting as such a timing signal (timing signal 2). The control signal 1003 and the control signal 1004 form a timing signal of a constant period.

In the case where a CCD is used as the image sensor 3, the distance-measuring optical apparatus operates as follows. Where the imaging system is an NTSC progressive system, a start control signal for the driving current is generated at an interval of 15/1 second, and a pre-movement image signal and a post-movement image signal are obtained at an interval of 30/1 second. Where the imaging system is an interlaced system, a start control signal for the driving current is generated at an interval of 30/1 seconds, and a field-by-field pre-movement image signal and a field-by-field post-movement image are obtained at an interval of 60/1 second. Thus, frame-by-frame pre-movement and post-movement image signals can be generated by interpolation of scanning lines.

As described above, with the distance-measuring optical apparatus according to this embodiment, the imaging optical system is reciprocated at high speed between two positions which are away from each other in a direction substantially perpendicular to the optical axis, and image signals obtained when the imaging optical system 2 is at these two positions are subjected to an operation to find a distance from the imaging optical system to the object. Therefore, the distance measurement can be performed at high speed, and the distance-measuring results can be successively output. With the distance-measuring optical apparatus according to this embodiment, image signals obtained when the imaging optical system 2 is at two positions which are away from each other in a direction substantially perpendicular to the optical axis are subjected to an operation to find a distance from the imaging optical system to the object. Owing to the use of image signals with little blur, the distance can be found at high precision.

Second Embodiment

A distance-measuring optical apparatus according to a second embodiment has substantially the same general structure as that shown in FIG. 1, except for the following point. In this embodiment, the imaging optical apparatus 5 is moved in two directions which are substantially perpendicular to the optical axis 1. By moving the imaging optical apparatus 5 in two directions with respect to the optical axis 1, a distance to an object can be measured based on image signals obtained by the image sensor 3 when the imaging optical apparatus 5 has moved upward and downward with respect to the optical axis 1. Since the imaging optical apparatus 5 is moved in two directions, the imaging optical apparatus 5 can have a simple structure which is supported by a spring-type body and can be produced at low cost.

Figure 8:
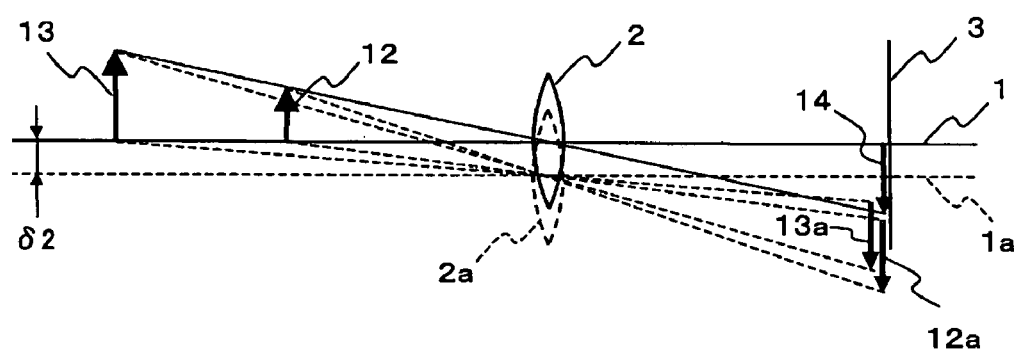
FIG. 8 shows conditions for distance measurement performed by a distance-measuring optical apparatus according to a second embodiment of the present invention.

FIG. 8 and FIG. 9 show conditions for performing distance measurement by the distance-measuring optical apparatus according to this embodiment at practically sufficient precision. FIG. 8 is substantially the same as FIG. 4. As described above with reference to FIG. 4, the image forming magnification at a shortest imaging distance of the imaging optical apparatus is m, and the image forming magnification, on the image sensor 3, of the long-distance object 13 which is located away from the short-distance object 12 by a distance-measuring resolvable distance is m'. In the state where main optical beams from the highest positions of the short-distance object 12 and the long-distance object 13 are incident in an overlapping state on the entrance pupil of the imaging optical apparatus 2, the height of the short-distance object 12 is "a" and the height of the long-distance object 13 is "b". The height of an image of the short-distance object 12 and the height of an image of the long-distance object 13 which are formed on the image sensor 3 are respectively |ma| and |m'b|, where |ma|=|m'b|.

Next, a state where the imaging optical apparatus 5 is moved in two directions substantially perpendicular to the optical axis leach by a distance δ2 will be discussed. The imaging optical apparatus is moved by the distance δ2 downward with respect to the optical axis 1 in FIG. 8 and upward with respect to the optical axis 1 in FIG. 9. The post-movement optical axis is represented by reference numeral 1a, 1b, and the post-movement imaging optical system is represented by reference numeral 2a, 2b.

With reference to FIG. 8, the height of an image 12a of the short-distance object 12 and the height of an image 13a of the long-distance object 13, formed on the image sensor 3 which has been moved downward, are respectively |m(a+δ2)| and |m' (b+δ2)|. With reference to FIG. 9, the height of an image 12a of the short-distance object 12 and the height of an image 13a of the long-distance object 13 (the height is the distance from the optical axis 1b on top of each image), formed on the image sensor 3 which has been moved upward, are respectively |m(a−δ2)| and |m' (b−δ2)|. As long as the height difference between the images 12a and 13a, after the imaging optical apparatus 5 moves upward or downward substantially perpendicular to the optical axis, is greater than the pixel pitch P of the image sensor 3, the inter-object distance can be recognized. This relationship is represented by expression (3).

$$\delta 2 \geq P/(|2m-m'|) \tag{3}$$

Once the shortest imaging distance to be measured, the distance-measuring resolvable distance, the focal length of the imaging optical system 2, and the pixel pitch P of the image sensor 3 are set, the movement distance δ2 by which the distance-measuring optical apparatus is to be moved substantially perpendicular to the optical axis 1 can be obtained from expression (3).

FIG. 10A, FIG. 10B and FIG. 10C are timing diagrams illustrating the relationship between the timing signal for imaging and the driving current in the distance-measuring optical apparatus according to this embodiment. The distance-measuring optical apparatus according to the second embodiment has substantially the same control block as that of the distance-measuring optical apparatus according to the first embodiment. For this reason, the distance-measuring optical apparatus will not be described with reference to a block diagram in this embodiment, and the following description will be provided using the same reference numerals as those used in the first embodiment.

FIG. 10A shows a start control signal 1020 generated by the driving control section 152 and indicating the timing for starting the supply of a driving current to the coils 8 and 9 as the driving section 151. FIG. 10B shows a driving current 1021 supplied from the driving control section 152 to the driving section 151. FIG. 10C shows a timing signal for imaging by the image sensor 3. In all the timing diagrams, the horizontal axis represents the time, and the vertical axis represents the current value or the voltage value. FIG. 11 is a timing diagram showing the movement of the imaging optical system 2 which is driven by the driving current flowing through the coils 8 and 9 of the distance-measuring optical apparatus according to this embodiment. The horizontal axis represents the time, and the vertical axis represents the positional change.

In FIG. 11, letters (a) and (b) both represent the positions at which the speed of the imaging optical system 2 becomes zero and the blur caused by the movement is minimum. According to this embodiment, the image sensor 3 is controlled by a timing signal, so that an image taken at the position represented by (a) (an image signal obtained after the imaging optical system 2 is moved) and an image taken at the position represented by (b) (an image signal obtained before the imaging optical system 2 is moved) are obtained using a mechanical or electronic shutter. By obtaining the image signals both at the position represented by (a) and the position represented by (b), images can be taken for a period with no blur.

It should be noted that the imaging optical system 2 which is driven moves with a delay of a certain time duration with respect to a change in the driving current because of inertia. As a result, the phase of the change in the driving current is advanced with respect to the positional change of the imaging optical system 2. Therefore, a timing signal indicating the time to obtain an image signal before the movement of the imaging optical system 2 needs to be delayed by a phase 1022 corresponding to the delay of the positional change and a phase 1023 corresponding to the time duration required by the imaging optical system 2 to move to the post-movement position, from the start control signal 1020 for generating the driving current. Reference numeral 1024 represents a control signal acting as such a timing signal. Another timing signal indicating the time to obtain an image signal after the movement of the imaging optical system 2 is set to be delayed by half a period with respect to the control signal 1024. Reference numeral 1025 represents a control signal acting as such a timing signal (timing signal 2). The control signal 1024 and the control signal 1025 form a timing signal of a constant period.

In the case where a CCD is used as the image sensor 3, the distance-measuring optical apparatus operates as follows. Where the imaging system is an NTSC progressive system, a start control signal for the driving current is generated at an interval of 15/1 second, and a pre-movement image signal and a post-movement image signal are obtained at an interval of 30/1 second. Where the imaging system is an interlaced system, a start control signal for the driving current is generated at an interval of 30/1 seconds, and a field-by-field pre-movement image signal and a field-by-field post-movement image are obtained at an interval of 60/1 second. Thus, frame-by-frame pre-movement and post-movement image signals can be generated by interpolation of scanning lines.

As described above, with the distance-measuring optical apparatus according to this embodiment, the imaging optical system is reciprocated at high speed between two positions which are away from each other in a direction substantially perpendicular to the optical axis, and image signals obtained when the imaging optical system 2 is located at these two positions are subjected to an operation to find a distance from the imaging optical system to the object. Therefore, the distance measurement can be performed at high speed, and the distance-measuring results can be successively output. With the distance-measuring optical apparatus according to this embodiment, image signals obtained when the imaging optical system 2 is located at two positions which are away from each other in a direction substantially perpendicular to the optical axis are subjected to an operation to find a distance from the imaging optical system to the object. Owing to the use of image signal with little blur, the distance can be found at high precision.

The imaging optical system of the distance-measuring optical apparatus according to this embodiment moves symmetrically with respect to the optical axis. Therefore, the structure for moving the imaging optical system can be smaller and simpler. The distance-measuring optical apparatus according to this embodiment can be more compact than that in the first embodiment.

Third Embodiment

Figure 12:
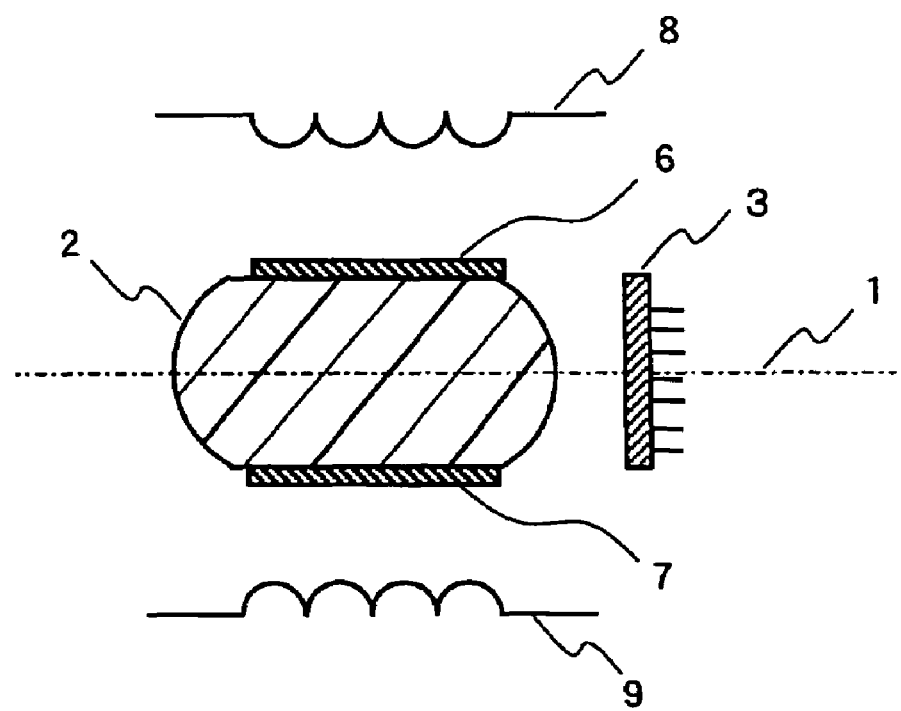
FIG. 12 is a cross-sectional view showing a general structure of a distance-measuring optical apparatus according to a third embodiment of the present invention.

FIG. 12 shows a general structure of a distance-measuring optical apparatus according to a third embodiment of the present invention. The imaging optical system 2 and the image sensor 3 are provided on the optical axis 1. In this embodiment, unlike in the first embodiment shown in FIG. 1, the imaging optical system 2 and the image sensor 3 are separate from each other. Accordingly, the housing 4 shown in FIG. 1 is not provided. On both sides of the imaging optical system 2, permanent magnets 6 and 7 are provided. Coils 8 and 9 are provided so as to face the permanent magnets 6 and 7, respectively. As in the first embodiment, a driving current is flown through the coils 8 and 9 to generate a magnetic field, and the imaging optical system 2 moves substantially perpendicular to the optical axis 1 by the interaction of the magnetic field generated by the coils 8 and 9 and a magnetic field generated by the permanent magnets 6 and 7. Image signals obtained by the image sensor 3 before and after the imaging optical system 2 is moved are subjected to an image operation. Thus, a distance to an object can be measured.

In this embodiment, only the imaging optical system 2 is driven. This is advantageous to cost reduction because, for example, the magnitude of interaction by the magnetic fields can be small and thus the driving power can be small, and the permanent magnets 6 and 7 and the coils 8 and 9 are only needed to generate a small magnitude of magnetic field. The moving distance of the imaging optical system 2 is added on a change in the height of the image formed on the image sensor 3. The precision of the distance measurement can be guaranteed by taking the moving distance into consideration when the image signals are subjected to an image operation using an appropriate image processing device.

As in the first embodiment, the imaging optical apparatus 5 can be constructed so as to move in only one direction substantially perpendicular to the optical axis 1. In this case, a distance to an object can be measured based on an image signal obtained by the image sensor 3 when the imaging optical apparatus 5 is on the optical axis 1 and an image signal obtained by the image sensor 3 after the imaging optical apparatus 5 is moved. Since the imaging optical apparatus 5 is moved in one direction, a space required for moving the imaging optical apparatus 5 can be small and thus the distance-measuring optical apparatus can be compact.

As in the second embodiment, the imaging optical apparatus 5 can be constructed so as to move in two directions substantially perpendicular to the optical axis 1. In this case, a distance to an object can be measured based on an image signal obtained by the image sensor 3 before the imaging optical apparatus 5 is moved and an image signal obtained by the image sensor after the imaging optical apparatus 5 is moved. Since the imaging optical apparatus is moved in two directions, the imaging optical apparatus 5 can have a simple structure which is supported by a spring-type body and can be produced at low cost.

Fourth Embodiment

Figure 13:
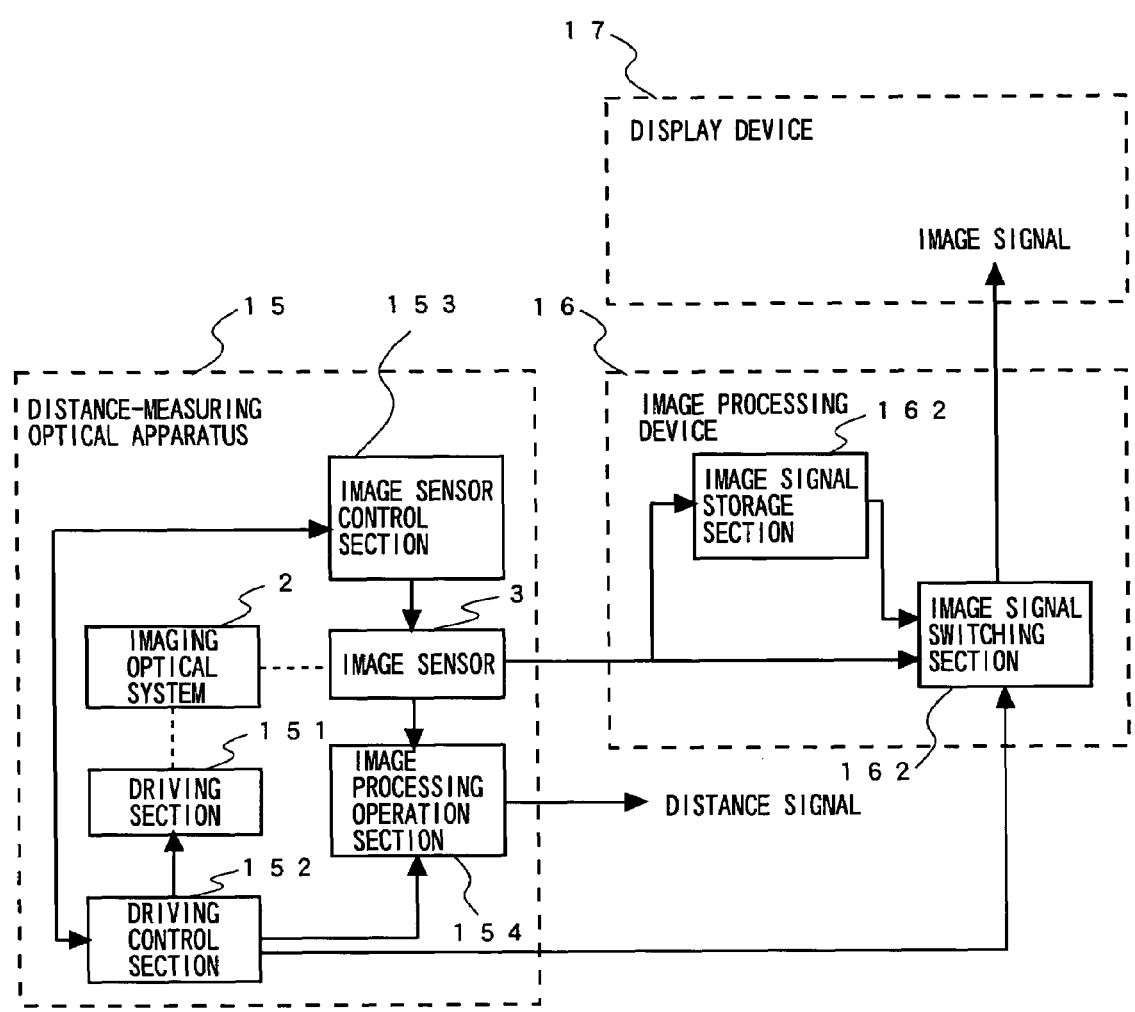
FIG. 13 is block diagram showing a structure of a distance-measuring system according to a fourth embodiment of the present invention.

FIG. 13 shows a distance-measuring system according to a fourth embodiment of the present invention. The distance-measuring system includes a distance-measuring optical apparatus 15 having a structure described in any one of the above embodiments, and an image processing device 16 and a display device 17.

The image processing device 16 includes an image signal storage section 162 and an image signal switching section 161. Image signals are input from the image sensor 3 to the image signal storage section 162 and the image signal switching section 161. The image signal before the imaging optical system 2 is moved is stored in the image signal storage section 162 and supplied to the image signal switching section 161. The image signal switching section 161 also receives a signal indicating the start of the movement of the imaging optical system 2 by the driving control section 152. Upon receipt of the signal from the driving control section 152, the image signal switching section 161 switches the image signal to be output from the image signal obtained by the image sensor 3 to the image signal supplied from the image signal storage section 162.

At the time of distance measurement, the imaging optical system 2 is moved substantially perpendicular to the optical axis 1. Therefore, the images taken during the movement are different from the images taken when the imaging optical system 2 is located on the optical axis 1. However, with the distance-measuring system in this embodiment, the image signal supplied from the image signal storage section 162 is used while the imaging optical system 2 is moving substantially perpendicular to the optical axis 1 for distance measurement. Thus, an image signal equivalent to the image signal when the imaging optical system 2 is located still on the optical axis 1 can be provided.

The image processing device 16 may have a structure of replacing the image signal during the distance measurement with an image signal generated by motion prediction based on the image signal obtained before the imaging optical system 2 is moved, instead of replacing the image signal during the distance measurement with the image signal obtained before the imaging optical system 2 is moved. In this case also, an image signal equivalent to the image signal when the imaging optical system 2 is located still on the optical axis 1 can be provided. Furthermore, even while an object is moving, an image signal equivalent to the image signal obtained by continuous imaging by the imaging optical system 2 can be provided. Furthermore, distance information which is output from the image processing operation section 154 may be superimposed on the image signal.

Fifth Embodiment

A distance-measuring system according to a fifth embodiment of the present invention will be described with reference to FIG. 14 and FIG. 15. FIG. 14 shows a display window 21 of a display device 17 of the distance-measuring system. In the display window 21, images of 22 and 23 of two objects taken by the distance-measuring optical apparatus are displayed. The imaging distance of the image 22 is short, and the imaging distance of the image 23 is long. In the display window 21, the image 22 with a shorter imaging distance can be displayed while being surrounded by a frame having a highly recognizable color of red or yellow based on the distance information obtained at the time of imaging, so as to alert the operator.

As shown in FIG. 15, the distance-measuring system according to this embodiment includes a distance-measuring optical apparatus 15 having a structure described in any one of the above embodiments, and an image processing device 26.

The image processing device 26 includes a distance determination section 261, a frame image signal generation section 262, and an image signal superimposition section 263. The image signal superimposition section 263 receives an image signal from the image sensor 3. The distance determination section 261 receives a distance-measuring result obtained by the image processing operation section 154. The distance determination section 261 determines whether the imaging distance is longer or shorter than a predetermined value based on the signal indicating the distance-measuring result, and supplies the determination result to the frame image signal generation section 262. When the imaging distance is shorter than the predetermined value, the frame image signal generation section 262 generates a frame image signal for surrounding the image of the object and supplies the frame image signal to the image signal superimposition section 263. The image signal superimposition section 263 superimposes the frame image signal on the image signal from the image sensor 3, and outputs the image signal as shown in FIG. 14 to the display device 17.

Figure 16:
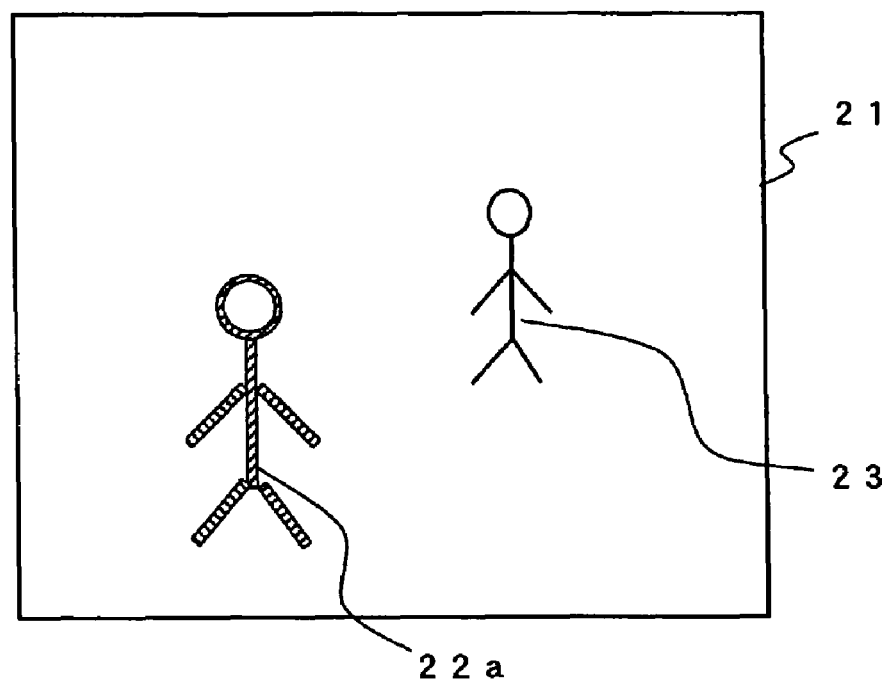
FIG. 16 shows an altered display state of the distance-measuring system according to the fifth embodiment.

Instead of the frame image signal generation section 262, a paint-out signal generation section may be provided for converting the color of an image with a short imaging distance into a highly recognizable color of red or yellow and outputting the image with such a color. In this case, as shown in FIG. 16, the color of an image 22a with a short imaging distance has been converted into a highly recognizable color of red or yellow, instead of the image signal indicating the image of the object being superimposed on by a frame image signal. In this way, the operator can be alerted.

Figure 17:
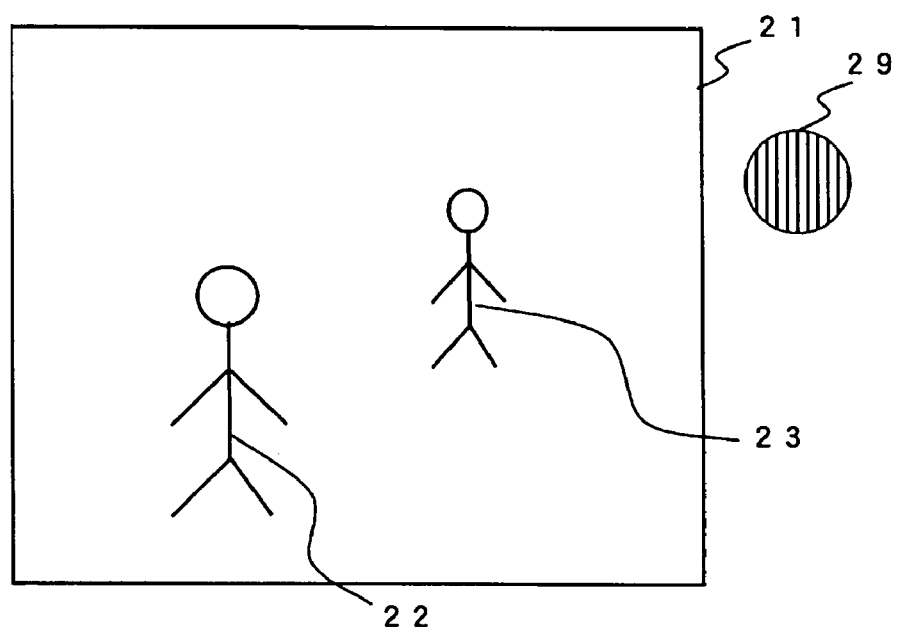
FIG. 17 shows another altered display state of the distance-measuring system according to the fifth embodiment.

Alternatively, the distance-measuring system can have a structure shown in FIG. 17. The display window 21 of the distance-measuring system displays the images 22 and 23 of two objects taken by the distance-measuring optical apparatus with no modification. When, for example, the imaging distance of the image 22 is detected to be shorter than a predetermined value based on the distance information obtained at the time of imaging by the image processing operation section 154, a sound generator 29 outputs an alarm so as to alert the operator.

Sixth Embodiment

Figure 18:
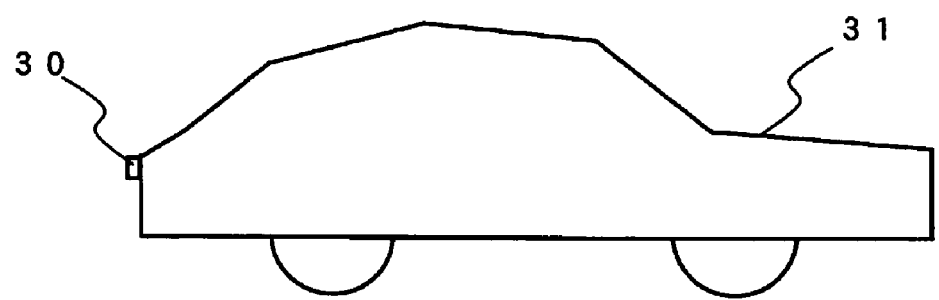
FIG. 18 shows an in-vehicle imager according to a sixth embodiment of the present invention.

FIG. 18 shows an in-vehicle imager 30 mounted on a vehicle 31. The in-vehicle imager 30 includes a distance-measuring optical apparatus having a structure described in any of the above embodiments. The distance-measuring optical apparatus according to the present invention can take images as well as measuring the distance. While the vehicle 31 is driven backward, the distance-measuring optical apparatus mounted in a rear part of the vehicle 31 can monitor and check the field of view behind the vehicle 31 and also measure the distance to an obstacle behind the vehicle 31.

An in-vehicle driving support apparatus can be provided using a distance-measuring system described in any of the above embodiments. The in-vehicle driving support apparatus includes a distance-measuring optical apparatus provided in a front or a rear section of a vehicle and a display section of the distance-measuring system for displaying an image signal from the distance-measuring optical apparatus. The display section is located in the vicinity of a driver's seat. The in-vehicle driving support apparatus can display a view in front of, or rear, the vehicle, and also output an appropriate alarm when an obstacle is detected at a short distance based on the distance-measuring information. Thus, information for avoiding the vehicle from bumping into the obstacle can be properly provided to the driver.

With the distance-measuring system in some of the embodiments, the distance information which is output from the image processing operation section 154 is superimposed on the image signal or is output as an alarm. The present invention is not limited to such a use. For example, when applied to an in-vehicle driving support apparatus, the distance information may be used to light up a light emitting diode or the like provided within the field of view of the driver, to control an illumination device provided in the vehicle to be lit up, to output an audio guidance from a sound generator instead of an alarm, or to transmit vibrations to a component such as a steering wheel which is in contact with the driver to alert the driver.

While the invention has been described in detail, the foregoing description is in all aspects illustrative and not restrictive. It is understood that numerous other modifications and variations can be devised without departing from the scope of the invention.

What is claimed is:

1. A distance-measuring optical apparatus for measuring a distance to an object as a target, comprising:
an imaging optical system for forming an image of the object;
an image sensor for taking the image of the object formed by the imaging optical system, converting the image into an image signal, and outputting the image signal;
a driving section for moving at least the imaging optical system substantially perpendicular to an optical axis;
an image sensor control section for outputting a periodical timing signal for designating a timing at which the image sensor takes the image of the object; and
a driving control section for controlling the driving section such that the imaging optical system reciprocates at a predetermined cycle between two positions which are away from each other in a direction substantially perpendicular to the optical axis;
wherein:
the periodical timing signal is periodically output when the imaging optical system driven by the driving section is located in the vicinity of the two positions which are away from each other in a direction substantially perpendicular to the optical axis; and
the distance-measuring optical apparatus further comprises an image processing operation section for receiving the image signal from the image sensor and performing an operation to obtain the distance from the imaging optical system to the object, using the image signal converted when the imaging optical system is at each of the two positions which are away from each other in a direction substantially perpendicular to the optical axis.

2. A distance-measuring optical apparatus according to claim 1, wherein the driving section moves the imaging optical system in one direction with respect to the optical axis.

3. A distance-measuring optical apparatus according to claim 2, wherein $\delta 1 \geq P/|m-m'|$ where m is the image forming magnification of an object located at a shortest imaging distance of the imaging optical system, m' the image forming magnification of an object which is away from the object at the shortest imaging distance by a distance-measuring resolvable distance, P is the pixel pitch of the image sensor, and $\delta 1$ is the distance by which the imaging optical system is moved in one direction substantially perpendicular to the optical axis.

4. A distance-measuring optical apparatus according to claim 1, wherein the driving section moves the imaging optical system in two directions with respect to the optical axis.

5. A distance-measuring optical apparatus according to claim 4, wherein $\delta 2 \geq P/(|2m-m'|)$ where m is the image forming magnification of an object located at a shortest imaging distance of the imaging optical system, m' the image forming magnification of an object which is away from the object at the shortest imaging distance by a distance-measuring resolvable distance, P is the pixel pitch of the image sensor, and $\delta 2$ is the distance by which the imaging optical system is moved in each of the two directions substantially perpendicular to the optical axis.

6. A distance-measuring optical apparatus according to claim 1, wherein the driving section moves the imaging optical system and the image sensor substantially perpendicular to the optical axis.

7. A distance-measuring optical apparatus according to claim 1, wherein the driving section moves only the imaging optical system substantially perpendicular to the optical axis.

8. A distance-measuring method for measuring a distance to an object as a target, wherein the distance-measuring method uses an imaging optical system for forming an image of the object; an image sensor for taking the image of the object formed by the imaging optical system, converting the image into an image signal, and outputting the image signal; and a driving section for moving at least the imaging optical system substantially perpendicular to an optical axis, the distance-measuring method comprising the steps of:

reciprocating the imaging optical system at a predetermined cycle between two positions which are away from each other in a direction substantially perpendicular to the optical axis; and performing an operation to obtain a distance from the imaging optical system to the object, using the image signal converted by the image sensor when the imaging optical system is at each of the two positions which are away from each other in a direction substantially perpendicular to the optical axis.

9. A distance-measuring system for measuring a distance to an object as a target, generating information which is to be recognized by an operator in accordance with the measured distance and presenting the information to the operator, the distance-measuring system comprising:

a distance-measuring optical apparatus for measuring the distance to the object; and a presentation section for generating information which is to be recognized by the operator in accordance with the distance measured by the distance-measuring optical apparatus and presenting the information to the operator;

wherein the distance-measuring optical apparatus includes:

an imaging optical system for forming an image of the object;

an image sensor for taking the image of the object formed by the imaging optical system, converting the image into an image signal, and outputting the image signal;

a driving section for moving at least the imaging optical system substantially perpendicular to an optical axis;

an image sensor control section for outputting a periodical timing signal for designating a timing at which the image sensor takes the image of the object; and a driving control section for controlling the driving section such that the imaging optical system reciprocates at a predetermined cycle between two positions which are away from each other in a direction substantially perpendicular to the optical axis;

wherein:

the periodical timing signal is periodically output when the imaging optical system driven by the driving section is located in the vicinity of the two positions which are away from each other in a direction substantially perpendicular to the optical axis; and the distance-measuring optical apparatus further comprises an image processing operation section for receiving the image signal from the image sensor and performing an operation to obtain the distance from the imaging optical system to the object, using the image signal converted when the imaging optical system is at each of the two positions which are away from each other in a direction substantially perpendicular to the optical axis.

10. A distance-measuring system according to claim 9, wherein the information to be recognized by the operator is information on a result of comparison of the distance measured by the distance-measuring optical apparatus and a predetermined distance value.

11. A distance-measuring system according to claim 9, wherein the presentation section includes one of a display device for displaying the information as an image signal; a light emitting device for transmitting the information as an optical signal, an illumination device for transmitting the information as an optical signal; a sound generator for transmitting the information as an audio signal; and a vibration generation device for transmitting the information as sense-of-touch information by vibrating a component operated by the operator.

12. A distance-measuring system according to claim 9, wherein the presentation section includes a display device for displaying the information as an image signal, and the display device is capable of displaying the image signal obtained by the image sensor as a visible image.

13. A distance-measuring system according to claim 12, wherein the presentation section includes:

a display device for displaying the information as an image signal; and an image processing device for replacing an image signal converted by the image sensor in a period in which the imaging optical system is moving substantially perpendicular to the optical axis with an image signal obtained by the image sensor before the imaging optical system is moved.

14. A distance-measuring system according to claim 12, wherein the presentation section includes:

a display device for displaying the information as an image signal; and an image processing device for replacing an image signal converted by the image sensor in a period in which the imaging optical system is moving substantially perpendicular to the optical axis with an image signal generated by motion prediction based on an image signal obtained by the image sensor before the imaging optical system is moved.

15. A distance-measuring system according to claim 13 or 14, wherein the image processing device displays an image of an object with a short imaging distance in the state of being surrounded by a frame of a highly recognizable color.

16. A distance-measuring system according to claim 13 or 14, wherein the image processing device displays an image of an object with a short imaging distance in the state where the color thereof is converted into a highly recognizable color.

17. An in-vehicle imager including a distance-measuring optical apparatus according to any one of claims 1 through 6.

18. An in-vehicle driving support apparatus including a distance-measuring optical system according to any one of claims 9 through 14.

* * * * *